United States Patent
Teng et al.

(10) Patent No.: US 9,647,819 B2
(45) Date of Patent: May 9, 2017

(54) MECHANISMS TO FACILITATE A TELECOMMUNICATION SYSTEM TO MAKE USE OF BANDS WHICH ARE NOT-LICENSED TO THE TELECOMMUNICATION SYSTEM

(75) Inventors: Yong Teng, Beijing (CN); Chunli Wu, Beijing (CN); Jian Feng Qiang, Beijing (CN); Jie Zhen Lin, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 69 days.

(21) Appl. No.: 14/239,312

(22) PCT Filed: Aug. 18, 2011

(86) PCT No.: PCT/CN2011/078563
§ 371 (c)(1),
(2), (4) Date: Feb. 18, 2014

(87) PCT Pub. No.: WO2013/023377
PCT Pub. Date: Feb. 21, 2013

(65) Prior Publication Data
US 2014/0204791 A1   Jul. 24, 2014

(51) Int. Cl.
*H04L 5/00*  (2006.01)
*H04W 16/14* (2009.01)
*H04W 24/10* (2009.01)

(52) U.S. Cl.
CPC .......... *H04L 5/0058* (2013.01); *H04W 16/14* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 6,466,793 B1 * | 10/2002 | Wallstedt | H04W 16/10 455/444 |
| 2007/0026868 A1 * | 2/2007 | Schulz | H04M 3/2227 455/454 |

(Continued)

FOREIGN PATENT DOCUMENTS

| | | |
|---|---|---|
| CN | 101154991 A | 4/2008 |
| CN | 102124809 A | 7/2011 |

(Continued)

OTHER PUBLICATIONS

M.I. Rahman, et al.; "License-exempt LTE systems for secondary spectrum usage: scenarios and first assessment"; 2011 IEEE International Symposium on Dynamic Spectrum Access Networks (DySPAN); pp. 349-358.

*Primary Examiner* — Derrick Ferris
*Assistant Examiner* — Ronald H Davis
(74) *Attorney, Agent, or Firm* — Harrington & Smith

(57) ABSTRACT

The present invention addresses a method, including configuring a remote device (UE) for measurements of at least one carrier in a first frequency band which is different from a second frequency band which is licensed used for communication by said remote device, receiving a measurement report from said remote device, and deciding on the usability of the at least one measured carrier in said first frequency band for communication by said remote device. Also, a method is proposed, including measuring at least one carrier in a first frequency band which is different from a second frequency band which is licensed used for communication by a remote device, and sending, to a network transceiver device, a measurement report of the measurements. Likewise, corresponding computer program products as well as correspondingly configured devices are addressed.

28 Claims, 4 Drawing Sheets

(56) References Cited

U.S. PATENT DOCUMENTS

| | | | |
|---|---|---|---|
| 2011/0124329 A1 | 5/2011 | Lindoff et al. | |
| 2011/0281578 A1* | 11/2011 | Narasimha | H04L 5/001 455/423 |
| 2012/0157143 A1* | 6/2012 | Tsunekawa | H04L 5/0058 455/509 |
| 2012/0195283 A1* | 8/2012 | Kwon | H04L 5/001 370/329 |
| 2012/0281594 A1* | 11/2012 | Stewart et al. | 370/259 |
| 2013/0121299 A1* | 5/2013 | Kim et al. | 370/329 |
| 2013/0155991 A1* | 6/2013 | Kazmi | H04W 72/0453 370/329 |
| 2013/0336156 A1* | 12/2013 | Wei | H04L 5/001 370/252 |
| 2013/0343324 A1* | 12/2013 | Lin | H04L 5/001 370/329 |
| 2013/0344883 A1* | 12/2013 | Rinne | H04W 72/0453 455/452.1 |
| 2014/0044000 A1* | 2/2014 | Charbit et al. | 370/252 |

FOREIGN PATENT DOCUMENTS

| | | | | |
|---|---|---|---|---|
| GB | 2477649 A | | 8/2011 | |
| WO | WO 2010/094482 A1 | | 8/2010 | |
| WO | WO 2010/111150 A2 | | 9/2010 | |
| WO | WO/2011/024646 | * | 3/2011 | H04W 28/20 |

* cited by examiner

MECHANISMS TO FACILITATE A TELECOMMUNICATION SYSTEM TO MAKE USE OF BANDS WHICH ARE NOT-LICENSED TO THE TELECOMMUNICATION SYSTEM

FIELD OF THE INVENTION

The present invention relates to mechanisms, i.e. methods, devices and computer program products, which facilitate a telecommunication system to make use of bands not licensed to the telecommunication system for communication. That is, in relation to the present invention, any band not licensed to the service of the telecommunication system concerned could be targeted by the present invention, including the case of license-exempt band but also a band licensed to other services which are distinct from the subject telecommunication system's service. Stated in other words, for the purpose of the following description, a frequency band licensed for use by the telecommunication system is referred to as a second frequency band and denoted as IMT band. On the other hand, any band not licensed to the telecommunication system is referred to as a first frequency band and denoted as non-IMT band. Those non-IMT bands cover unlicensed (or license-exempt) bands such as an ISM band, as well as bands licensed for services distinct from the IMT telecommunication services.

BACKGROUND

Mobile data transmission and data services are constantly making progress. With the increasing penetration of such services, the need for increased bandwidth also increases. However, for standardized telecommunication systems, there is always a specifically assigned bandwidth (also known as licensed IMT-band) within the entire radio bandwidth for use by that system for mobile, i.e. wireless, communication. The present invention relates to such an environment of a telecommunication system such as for example LTE (Long Term Evolution) or LTE advanced, LTE-A, system or subsequent versions thereof. Those are referred to as mere examples only and others could likewise benefit from the present invention described herein below.

In particular, one approach to cope with the increased need for data transmission and correspondingly increased need of transmission bandwidth is known as a concept of carrier aggregation (CA). In connection with carrier aggregation, data transmission between a network transceiver device (such as a base station BS, NodeB, or evolved NodeB, eNB) and a user terminal, such as a mobile station MS or user equipment UE, makes use of bandwidth within the licensed band (e.g. the IMT band allocated/reserved for that purpose and/or telecommunication system by the International Telecommunication Union (ITU)) as well as of bandwidth different from (e.g. out of) that band denoted as non-IMT band (i.e. license-exempt band or a band licensed to other services/systems). Herein below, for simplicity, it is referred to an IMT band (as an example of licensed band for the telecommunication system) and non-IMT band (representing a different band, not licensed for mobile communication systems like GSM, UMTS, or LTE/LTE-A; i.e. license-exempt bands or bands licensed to other services/systems). Examples of non-IMT bands are a C-band, a TV white space band, an ISM band (Industrial Scientific Medical), etc.

Hence, from the above it turns out that the present invention is related to a concept to be setup for LTE-A or a future version beyond LTE-A, e.g. within a subsequent release of 3GPP (e.g. 3GPP Rel-12 or later releases) (3GPP=$3^{rd}$ Generation Partnership Project). Specifically, the present invention is related to an extension from a current LTE-A scheme in terms of supporting utilization of additional band or bands, i.e. non-IMT-bands (e.g. C-band, TV white space band, ISM band) by an LTE-A base station/evolved NodeB, eNB, and user terminal UE having a capability referred to as cognitive radio capability (i.e. having an ability to realize that non-IMT bands are present and potentially available to expand communication bandwidth).

In 3GPP standardization, carrier aggregation technologies are used to aggregate several carriers (on maybe different bands) and then provide high data rate service for UE. Currently, however, only carrier aggregation for (licensed) IMT bands is standardized in 3GPP. However, utilization of non-IMT bands for an LTE-A system or beyond will very likely be introduced in a future release e.g. R12 or later.

In view of carrier aggregation based on IMT bands, being already known, a repeated definition of principles applied by that technique is omitted here as a skilled reader is assumed to be familiar therewith as well as with related terminology, which—to the extent possible and without any intention of limiting the scope of the present invention—is used by way of example also in the present description for describing the present invention.

FIG. 1 shows a brief schematic of IMT and non-IMT band utilization over time t in carrier aggregation. Reference is made to a non-IMT band (as unlicensed band such as e.g. an ISM band) for use by an LTE-A system in carrier aggregation when a primary service (for the non-IMT band) does not appear, i.e. is not used or "active" in the non-IMT band. As shown in the upper part of the FIG. 1, the carrier in the IMT band is permanently assigned and/or available for use by e.g. the LTE-A system. In the lower part of FIG. 1, although a single carrier is shown only to keep the illustration and description easy, plural non-IMT bands may be present and exploited for carrier aggregation. A non-IMT band is typically assigned to a specific service (different from LTE-A or the like) which is referred to as a primary service for the non-IMT band. In periods in which the primary service is silent or inactive on the non-IMT band, the non-IMT band may be available for other services such as e.g. LTE-A, which may be referred to as secondary service (from the perspective of the non-IMT band).

Thus, as shown in FIG. 1, the non-IMT bands which are accessible with CR (Cognitive Radio) capability may include bands allowing secondary usage, e.g. C-band, TV White Space, or unlicensed equally usage e.g. ISM bands. Those bands can be categorized in two types:
predictable variance on usability and
unpredictable variance on usability.

For instance, in TV white space, the incumbent TV broadcast service occupation is predictable (based on the "TV program", for instance), while the incumbent wireless microphone service occupation is unpredictable. Then, the usability of this band is partially predictable, insofar as at least during the predicted TV broadcast duration, the band is not available for CR usage, while on other durations, the band usability is still unpredictable due to a potential use by a wireless microphone service. As another example, in the ISM band all the radio access technologies, RATs, have equal access right; hence, the ISM band is definitely unpredictable in terms of usability for LTE-A as a secondary service.

It is expected that an eNB (or BS) can provide for timely utilization of such non-IMT band when it is just available, or eNB can provide for timely release of such band when it is aware of an incumbent service. This shall maximize the efficiency of this band's utilization and more important, minimize potential interference to incumbent services.

For unpredictable bands, their utilization for the IMT system such as LTE-A is very opportunistically. Then, a fast understanding on situations prevailing in those bands is essential and corresponding signalling mechanism need to be designed to be quickly effective. It is assumed that predictable bands may be easier for eNB/BS configurations and because of their predictable character. But even in predictable condition, sometimes frequent variance on usability will still require more effective understanding on immediate imminent situations of those bands.

Thus, there is still a need to further improve such systems, e.g. communication systems operating in a carrier aggregation mode aggregating IMT bands as well as non-IMT bands.

SUMMARY

By virtue of at least some aspects of the invention, further improvement of such systems, e.g. communication systems operating in a carrier aggregation mode aggregating IMT bands as well as non-IMT bands, is achieved. Various aspects of examples of the invention are set out in the claims.

According to a first aspect of the present invention in relation to a network transceiver device such as a eNB, there is provided a method, comprising configuring a remote device (UE) for measurements of at least one carrier in a first frequency band which is different from a second frequency band which is licensed used for communication by said remote device, receiving a measurement report from said remote device, and deciding on the usability of the at least one measured carrier in said first frequency band for communication by said remote device; as well as a device, comprising a control module, configured to configure a remote device (UE) for measurements of at least one carrier in a first frequency band which is different from a second frequency band which is licensed used for communication by said remote device, and a transceiver module configured to receive a measurement report from said remote device, and wherein the control module is further configured to decide on the usability of the at least one measured carrier in said first frequency band for communication by said remote device.

According to a second aspect of the present invention, in relation to a terminal device such as a UE, there is provided a method, comprising measuring at least one carrier in a first frequency band which is different from a second frequency band which is licensed used for communication by a remote device, and sending, to a network transceiver device, a measurement report of the measurements; as well as a device, comprising a measurement module configured to measure at least one carrier in a first frequency band which is different from a second frequency band which is licensed used for communication by a remote device, and a transceiver module configured to send, to a network transceiver device, a measurement report of the measurements.

According to a third aspect of the present invention, there are provided computer program products comprising computer-executable components which, when the program is run on a computer, are configured to implement the above methods. The above computer program products may further comprise computer-executable components which, when the program is run on a computer, perform the method aspects mentioned above in connection with the UE or eNB related method aspects. The above computer program product/products may be embodied as a computer-readable storage medium.

Thus, performance improvement is achieved by those methods, devices and computer program products, at least in exemplary embodiments and/or at least by exemplary features thereof, in that one ore more of the following advantages are realized:

Fast reaction for utilization of non-IMT band due to variant usability for those bands;
Increase in PDCCH capacity and scheduling flexibility for LTE-A system (PDCCH=Physical Downlink Control Channel);
Reduction of measurement report overhead;
Simplify eNB's behaviour;
Less signaling introduced;
Less modifications on specifications required.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
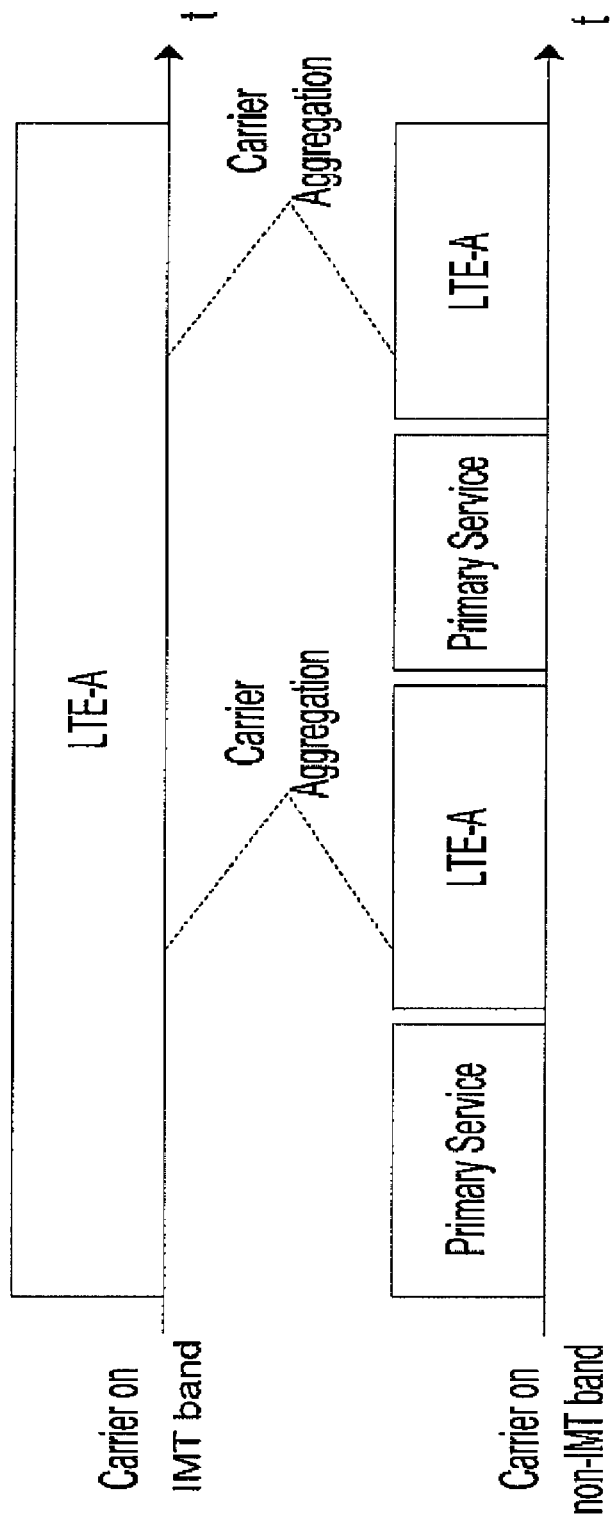
FIG. 1 shows a brief schematic of IMT band and non-IMT band utilization over time t in carrier aggregation.

Exemplary aspects of the invention will be described herein below.

Generally, according to the present invention it is proposed that for cell operations on non-IMT band, a UE reports carriers and, according to at least a sub-aspect, a carrier type indication. Further, as an option in relation to at least another aspect, the UE also sends a pattern on a carrier's availability and carrier type indication to an eNB for a future specific period. Optionally, the UE suggests to the eNB a change in terms of the UE's cross-scheduling configuration for its secondary cells SCell on a non-IMT band. The eNB then decides on the usability of measured bands based on the reported carrier type indications and/or checks whether reconfigurations are needed, e.g. in terms of using/releasing this carrier or changing the carrier's property (use as primary cell PCell or secondary cell SCell, cross-scheduling/non-cross-scheduling) for the UE.

More specific, for cell operations on a non-IMT band, e.g. carrier aggregation using IMT (also referred to as second frequency band) and non-IMT bands (also referred to as first frequency band), network transceiver device aspects as well as terminal device aspects are addressed by the present invention.

That is, an eNB configures to a UE different levels of measurement threshold for respective carriers in a non-IMT band. Also the eNB configures to a UE a measurement report configuration, i.e. whether the reports are to be sent event triggered or periodically, and which parameters are to be included (e.g., as described herein below: "full" carrier type indication, carrier type change indication, or carrier frequency only). The measurement is not limited to traditional measurement in current LTE release and, hence, a measurement item and/or object may not be configured to be the same as those measured in the IMT band. A measurement item as defined here denotes any physical or logical quantity that can be measured for the carrier, e.g. received signal strength, signal to interference ratio, bit error ratio, or the like.

The UE performs a carrier classification based on configured measurement thresholds applied to the measurement results.

In at least an exemplary scenario, the UE then reports the carriers and e.g. a 2 bit Carrier Type Indication to the eNB. The report can be sent (as configured for reporting) in a regular manner (e.g. in regular intervals or at fixed absolute times) or in an event triggered manner (e.g. in the event of a carrier type indication was classified to have changed).

When adopting a 2 bit indicator, four different Carrier Type Indications could be coded:

Type I (e.g. "11"): denotes a possible PCell candidate;
Type II (e.g. "10"): denotes a possible SCell candidate with full/partial control channel capability e.g. PDCCH;
Type III (e.g. "01"): denotes a possible SCell candidate without any control channel capability;
Type IV (e.g. "00"): denotes an unusable carrier.

The number of carrier type indications used can differ for different carriers. Generally, carriers can be distinguished between those that are unused in carrier aggregation and thus do not constitute a serving cell (thus representing a non-serving cell) and those used in carrier aggregation and thus do constitute a serving cell (thus representing a serving cell).

For non-serving cells, the Carrier Type Indications reported may only include Type I, Type II, and Type III. This restricted number of types reduces signaling overhead. For serving cells on non-IMT band, Carrier Type Indications reported include all the four types above.

The eNB keeps record and/or knows which carriers from which band (IMT or non-IMT) are used and which are not, and which of those may thus constitute a serving or non-serving cell, respectively.

If assuming that a primary cell PCell can only be on IMT band, for reasons of stable quality for initial access and security input, the carrier type indication size could even be reduced to 1 bit only as an alternative. In such exemplary scenario, the 1 bit does no longer indicate one of plural carrier types (or classes), but indicates merely a Carrier Type Change to the LTE-A system, i.e. the eNB, for a certain non-IMT carrier based on the threshold configured by the eNB and measurement effected by the UE.

For a non-serving carrier on non-IMT band, such 1 bit indicates that this carrier can be a usable secondary cell SCell with (full or partial) control channel capability (e.g. when set to "1"), or a usable SCell (e.g. when set to "0") without control channel capability. For a serving carrier on non-IMT band, such 1 bit indicates that this carrier is unusable now (e.g. when set to "0"), or this carrier can still be a usable SCell (if set to "1") but with change on control channel capability (e.g. from full/partial to non or vice versa, or from "full" to "partial" or vice versa). Since the eNB has knowledge of the prevailing carrier state or property, i.e. whether the carrier is serving or non-serving and of which "type" (with (full/partial)/without control channel capability) the carrier is, the eNB is enabled to decide on a proper state transition of the carrier to a new changed state.

The reports from the UE towards the eNB are appended into measurement reports and sent to eNB, e.g. via RRC signaling or within media access control element (MAC CE). Then, the eNB decides on the usability of the measured bands, with the decision based on the reported types, and/or decides if reconfigurations are needed e.g. using/releasing this carrier or changing the carrier's property (PCell/SCell, cross-scheduling/non-cross-scheduling) for the UE.

According to a further exemplary aspect, the UE may also send a respective pattern on carrier availability and Carrier Type Indication to the eNB for a future specific period. For example, this is possible for a scenario in which a non-IMT-capable UE is able to access a database in which such time pattern is stored, while the eNB cannot access such database. The UE optionally also sends to the eNB a suggestion on specific scheduling carrier for a carrier on non-IMT band. The UE optionally even suggests patterns of scheduling (non-IMT) carriers for a future specific period.

According to the situations for specific carriers on a non-IMT band which are known to the UE through its measurements and/or via accessing a database, the UE can alternatively send to the eNB a suggestion in terms of changing the UE's cross-scheduling configuration for its SCells on the non-IMT band, i.e. from cross-carrier scheduling to non-cross-carrier scheduling, or reverse, via MAC CE or RRC signaling.

When configuring the UE for the measurements for carriers on non-IMT band, it is to be noted that those measurements are not limited to traditional measurement as defined in current LTE release. The measurement items, i.e physical/logical quantities to be measured by the UE and as configured to the UE by the eNB also involve that the UE is configured different levels of measurement threshold. At least one measurement threshold level per measurement item is defined. Also, at least one measurement item per carrier is defined. Those new measurements could be e.g. power density of beacon signals from other services potentially operated on non-IMT bands, and/or received power level from cognitive pilot channel, bit error rate, etc., i.e. generally any other carrier measurement as defined e.g. for LTE in present specification. As carrier occupation on non-IMT bands is quite different from carrier occupation on licensed bands, potentially quite more measurements are needed on those variant bands than on licensed bands. Therefore, reporting concerns in particular information which is usable for deciding on the usability of those bands. Then, such information reporting also reduces reporting overhead on the uplink reporting channel between UE and eNB and contributes to less processing performed at eNB. The eNB can then react quickly to the variable usability of non-IMT bands.

Based on (one or more) predefined thresholds for maybe several measurement items for a respective carrier, the UE analyzes the measurement results for the carrier, and then judges usability of the carrier according to the configured thresholds.

Figure 2:
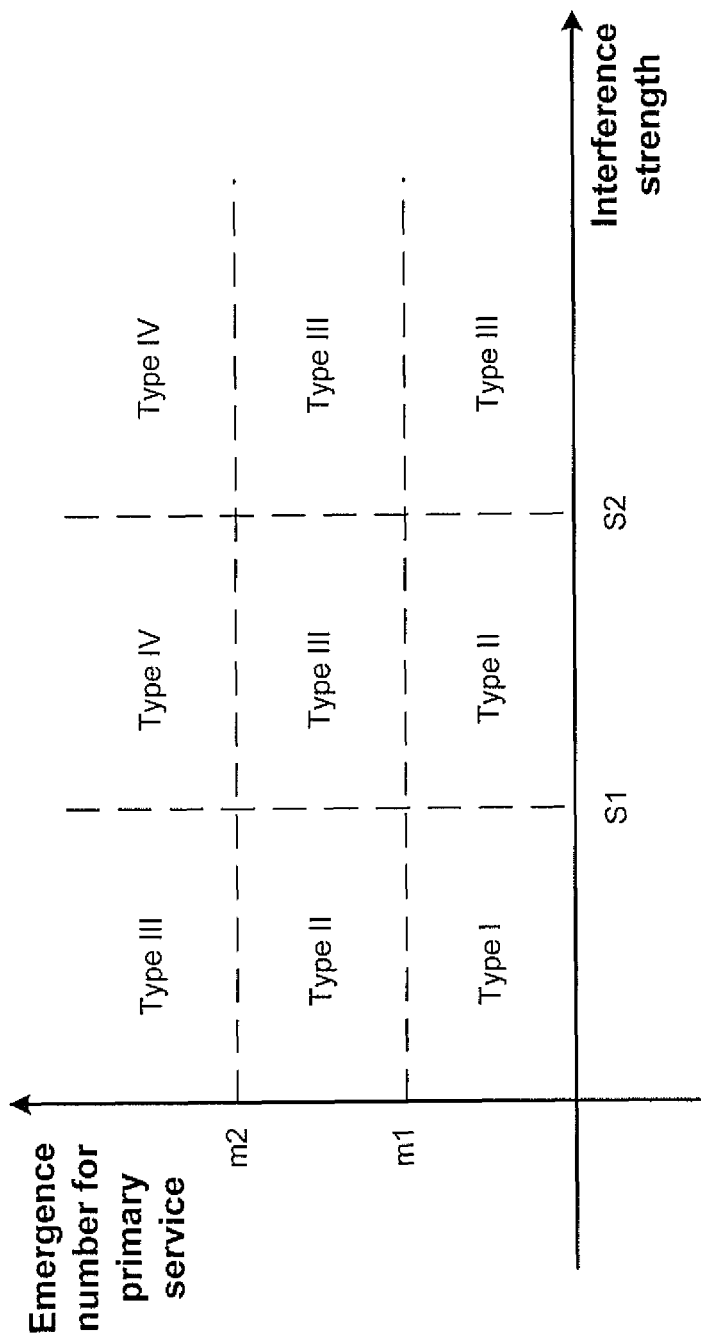
FIG. 2 illustrates, for an individual carrier, exemplary measurement thresholds for measured measurement items of the carrier and exemplarily resulting carrier type classifications.

FIG. 2 illustrates, for an individual carrier, exemplary measurement thresholds for measured measurement items of the carrier and exemplarily resulting carrier type classifications. As illustrated in FIG. 2, measurement includes two measurement items: interference strength (plotted in horizontal direction) and emergence number for a primary service on this non-IMT carrier. Emergence number here denotes the number of occurrences of the primary service (normally operated on the measured non-IMT band); this may be a number per time unit and/or frequency of occurrence and/or probability of occurrence and/or number plus respective duration upon occurrence. The emergence number can be based on current and previous ("historic") measurements, or can be obtained by accessing a database, as mentioned before, in which future (scheduled) occurrences are already registered (as e.g. likely in TV-White Space, TV-WS).

As shown in FIG. 2, per measurement item, two thresholds are defined: s1, s2 in regard of interference strength, and m1, m2 in regard of the emergence number. Note that the number of thresholds per measurement item can differ; it can be only one or more than 2. Also, the number of thresholds need not be identical for all measurement items measured for that carrier.

FIG. 2 shows a two-dimensional classification of the carrier type in view of two measurement items, however, a one-dimensional or multi-dimensional (e.g. more than 2) evaluation is also possible depending on the number of measured measurement items, i.e. physical/logical quantities per carrier.

In FIG. 2, the plane defined by interference strength and emergence number is divided by the respective thresholds in individual areas to which are assigned the carrier type indications as classified. Thus, in view of measured values falling in one of those fields, the carrier is classified by the UE based on the threshold values.

The UE thus gets the information on usability of the carrier according to predefined rules as e.g. reflected by the thresholds. In order to have in-time reflection on the usability of the carriers available for the eNB, the UE sends available new carriers and corresponding Carrier Type Indication to the eNB. For serving cells on non-IMT band, generally only when radio link situation impacts the usability of the carrier which leads to a change in carrier usability, the Carrier Type Indication is only reported when changed from its previous state. This reduces signaling overhead. Nevertheless, carrier type indications can also be periodic if configured, rather than triggered by an event (such as a state change event).

The eNB receives the reports from UE on available carriers and respective Carrier Type Indication for non-serving cells, or for a change of Carrier Type Indication for serving cells. Further simplification, according to another exemplary embodiment, could be just to indicate usable or not usable for LTE-A for a certain non-IMT carrier based on the threshold configured for UE's measurement at the UE by the eNB. E.g. if a serving frequency (carrier) is included in the report, it means the frequency is not usable for LTE-A anymore; while, if a non-serving frequency (carrier) is included in the report, it means the frequency is usable for LTE-A. In such scenario, signaling overhead is further reduced, and a carrier type indication as such is not necessary as the carrier type indication is now inherently present in the presence of the carrier/frequency in the report.

Based on those reports, the eNB carries out reconfiguration of carriers used in carrier aggregation, e.g. deactivates and/or removes a carrier/cell from SCell list, adds a new carrier/cell as a SCell, or even hands over to a cell on non-IMT band. For example, assuming in a beginning phase of carrier aggregation, that a PCell for a UE is on IMT band. In a later phase, a SCell is added to operate on non-IMT band for data extension purpose but scheduled from PCell which provides a stable and high performance radio link. After measurement performed for a period, the UE finds that on that SCell generally interference strength is tolerable for quality of control channel, then UE may send a suggestion to eNB in terms of a change in the cross-carrier scheduling configuration so that data transmission on the SCell can be scheduled from itself, which then increase PDCCH capacity for cells on licensed IMT band. This message can be via a MAC control element or RRC signaling.

Figure 3:
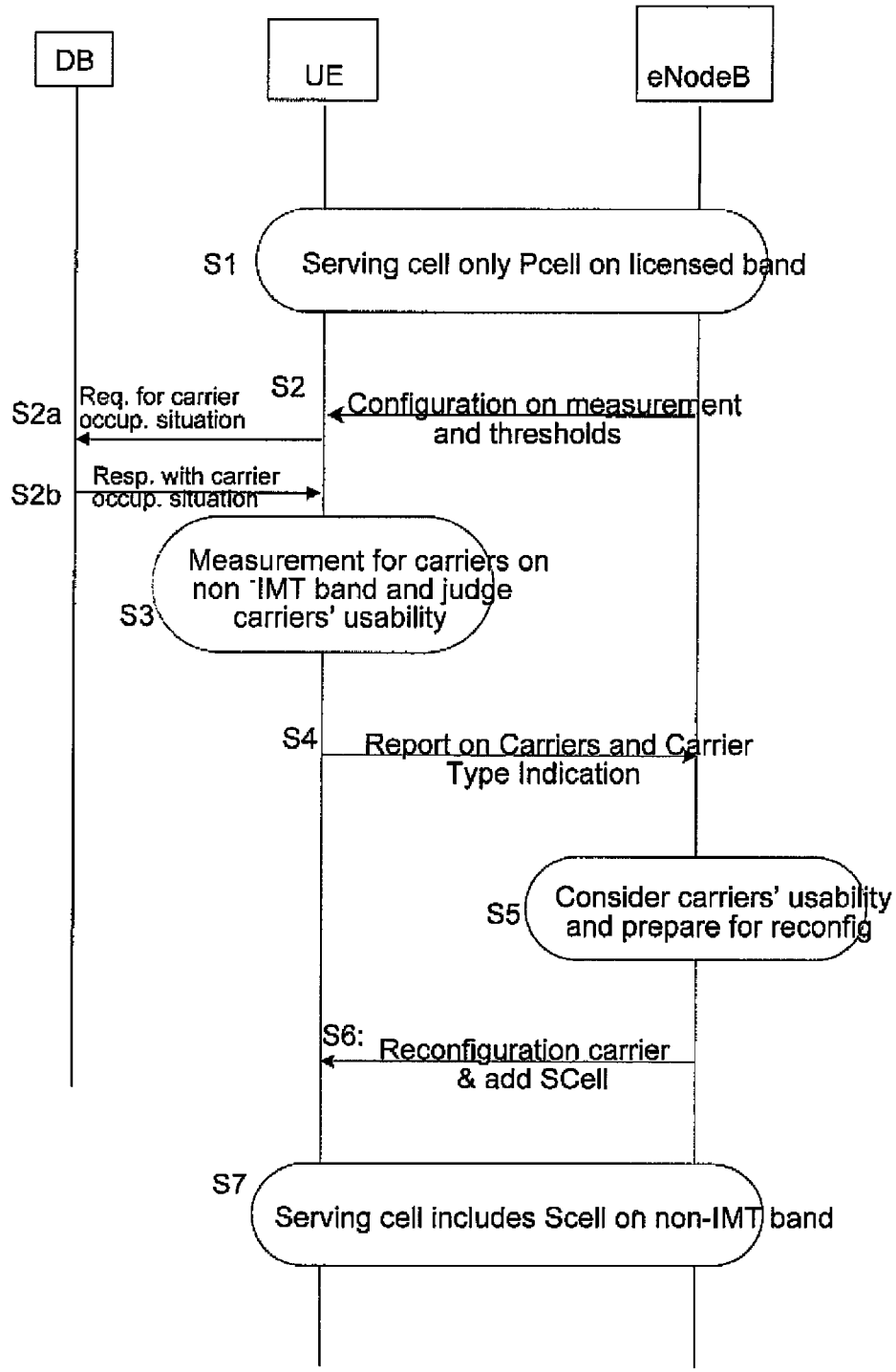
FIG. 3 illustrates an exemplary signaling diagram of operations carried out by and signaling exchanged between an eNB and a UE operating in carrier aggregation mode on IMT and non-IMT bands, and also potential signaling between the UE and a database.

An exemplary procedure is shown in FIG. 3. FIG. 3 illustrates an exemplary signaling diagram of operations carried out by and signaling exchanged between an eNB and a UE operating in carrier aggregation mode on IMT and non-IMT bands, and also a potential signaling between the UE and a database.

The signaling starts in a step S1. In the illustrated example scenario, there is only one serving cell, which is the primary cell for carrier aggregation and established in the IMT band, In a step S2, the eNB sends a configuration request and corresponding data to the UE. I.e. the eNB instructs the UE which measurement items to measure on carriers in the non-IMT band, and which thresholds to apply per measurement item. Likewise, together therewith, the eNB assigns to the UE, per measured carrier, at least one measurement report configuration, i.e. whether the reports are to be sent event triggered or periodically, and which parameters are included (e.g. all four or a subset thereof of carrier type indications, carrier type change indication, or reducing the change indication to the presence of the carrier frequency only). Which of potentially plural measurement report configuration is used is also configurable, e.g. once a day, a full report is issued using carrier type indication, while afterwards, it is switched to another report such as a "reduced" report which relies on e.g. carrier type change indication only, to reduce signaling overhead.

The measurement reports can be configured to be sent via a frequency usable and currently assigned (activated) for communication in the (measured) non-IMT band or in the IMT band (which could be more reliable and not subject to sudden changes).

In step S3, the UE carries out the measurement for carriers on the non-IMT band or bands (i.e. frequency or frequencies). Based on the measurement results and the configured thresholds, it judges/determines a respective measured carrier's usability for carrier aggregation in e.g. LTE-A. In a step S4, the UE sends the report on the measured carriers and the carrier type indications to the eNB. This may imply the carrier type indication (Type I to IV), or the carrier type change indication, or the mere carrier/frequency, depending on which of above exemplary realizations is chosen and which is configured for the measured carrier. Also, a combination of those realizations can be implemented. In a step S5, the eNB considers the reported carrier's usability and prepares for a potential reconfiguration of the carrier aggregation scenario. In a step S6, the eNB then reconfigures the carrier aggregation scenario in terms of adding (or removing) secondary cells/carriers, or other measures as mentioned above. As shown in a step S7, then the serving cell (eNB) includes (the primary cell PCell on the IMT band) as well as a secondary cell SCell on the non-IMT band. Thus, in this regard, the eNB reconfigures the measured non-IMT carriers based on the decided usability for communication by said remote device, and likewise reconfigures carriers of said frequency band in the IMT band which is licensed used for communication by said remote device, based on the changed property of the measured carrier. Namely, for example, if the measured carrier is re-configured as being cross scheduled, then a scheduling carrier on IMT-band is correspondingly re-configured to be aware of this.

Optionally, as mentioned above and as also shown in FIG. 3, the UE may access a database DB. For example, in a step S2a, the UE accesses the database DB and requests information pertaining to the (current and/or future) occupation situation of the carriers in the non-IMT band, i.e. queries e.g. current and/or future emergence number information from the database for the carrier(s) concerned, or patterns related to occupation situation for the carrier(s) concerned. The database (after optional authentication/authorization of the UE) responds in a step S2b with information on the carrier occupation situation by a primary service (non-LTE-A service). The UE then takes that information into account when judging a carrier's availability (in step S3).

In the scenario shown in FIG. 3, 52a and S2b are carried out before measurement and judging, i.e. step S3. However, in a modification (not shown), step S3 could be split to a measurement step and a separate judging step afterwards. Then, steps S2a, S2b could also be carried out after measuring, but still before judging.

Moreover, it is also possible that the UE may also send its measurement results to the database DB, in order to update the relevant information in DB (not shown in the Figure).

Figure 4:
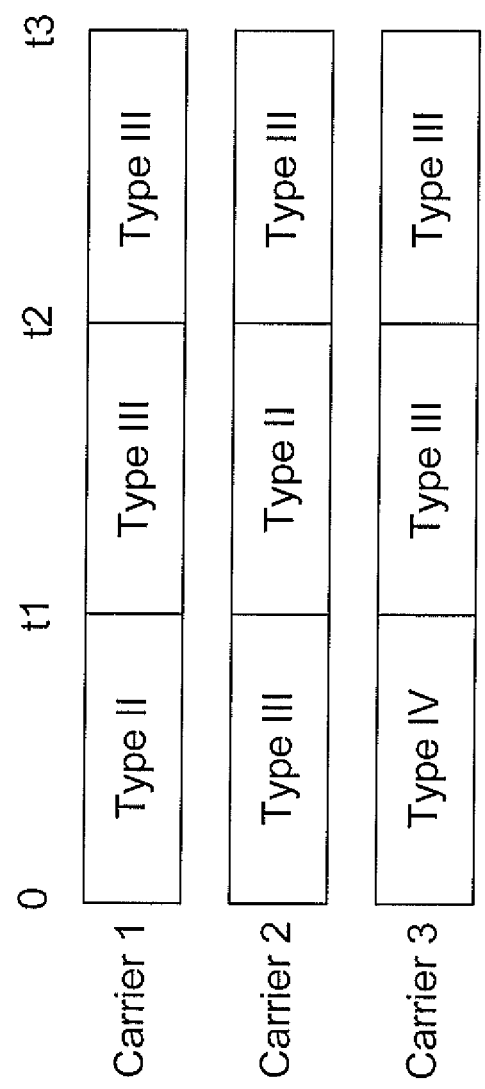
FIG. 4 illustrates an exemplary pattern of carrier types as a function of time, as e.g. retrieved from a database and reported for carriers in the non-IMT band from a UE towards an eNB.

FIG. 4 illustrates an exemplary pattern of carrier types as a function of time, as e.g. retrieved from a database and reported for carriers in the non-IMT band from a UE towards an eNB.

As already mentioned above, in some scenarios such as the one shown in FIG. 3, a multi-service capable UE is able to access a database via a non-IMT service, while the eNB cannot. Especially for bands with predictable variance of usability, the UE gets relatively stable and/or reliable occupation situation for that carrier. Therefore the "smart" UE sends a pattern on carriers' availability and Carrier Type Indication to the eNB for a future specific period, as illustrated in FIG. 4 as a example.

FIG. 4 illustrates a rough example of a content of the database DB shown in FIG. 3. The DB stores information for e.g. 3 carriers, carrier 1 to 3. Each information covers the time from a time t=0, via t1, t2 to a time t3. For each interval in time t0->t1, t1->t2, t2->t3, a carrier type indication is stored in the database. Under the assumption of relatively constant interference strength measured for a carrier (at least not varying beyond the defined thresholds), those different types then reflect the emergence number, i.e. the change thereof, over time and thus transitions in carrier type indications in the graph of FIG. 2 within an interval (e.g. between s1 and s2, or the like) defined for the respective thresholds.

Generally, the invention is implemented in a module, e.g. a controller module of a UE and eNB, respectively, which are capable of operating in carrier aggregation mode. Also, the method, devices and computer program products presented herein are generally applicable to such carrier aggregation scenarios, whether implemented under LTE-A or any other telecommunication standard. Other systems can benefit also from the principles presented herein as long as they have identical or similar properties like e.g. the LTE-A system.

Although hereinbefore some focus of the description has been laid on method aspects involved, it is to be understood that those method aspects can be implemented by computer program products or in hardware. Namely, a device such as the eNB or UE typically comprises an interface for communication (e.g. a transceiver or transceiver module), an internal memory and a control module controlling the operation of the entire device based on data received from external and/or fetched from the internal memory. The control module can be an application specific integrated circuit ASIC which is configured to implement the method, or a digital signal processor DSP, or another processor configured to implement the method, or the like. In connection with the present invention, the UE is in particular further equipped with a configurable measurement module so as to be enabled to carry out the measurements on non-IMT bands, and as configured by the eNB. Note that the UE, i.e. its measurement module can also be configured upon manufacturing, or upon servicing (e.g. hardware or software update); though, a remote configuration by the eNB is preferable in terms of flexibility and user comfort.

Embodiments of the present invention may be implemented in software, hardware, application logic or a combination of software, hardware and application logic. The software, application logic and/or hardware generally resides on modules or chipsets of the respective device. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment, or network transceiver device such as an evolved NodeB, eNB.

The present invention relates in particular but without limitation to mobile communications, for example to carrier aggregation environments under LTE, LTE-A, or the like and can advantageously be implemented in user equipments or smart phones, or personal computers connectable to such networks. That is, it can be implemented as/in chipsets to connected devices, and/or modems thereof.

If desired, at least some of different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes, in the framework of e.g. LTE-A and cognitive radio enabled user equipments, mechanisms (methods, devices and computer program products) related to network transceiver devices such as eNBs and terminals such as UEs to facilitate an LTE-A system's utilization on non-IMT band. To this end, among others, it is proposed that for cell operations on non-IMT band UE reports carriers and carrier type indication, and in an optionally possible modification, UE also sends a pattern on carriers availability and carrier type indication to eNB for a future specific period. When necessary, UE suggests eNB to change the UE's cross-scheduling configuration for its SCells on non-IMT band. Then eNB makes decision on the usability of measured bands on the basis of the reported types or see if reconfigurations are needed e.g. using/releasing this carrier or changing the carrier's property (PCell/SCell, cross-scheduling/non-cross-scheduling) for the UE.

Thus, as has been disclosed herein above, the present invention addresses a method, comprising configuring a remote device (UE) for measurements of at least one carrier in a first frequency band which is different from a second frequency band which is licensed used for communication by said remote device, receiving a measurement report from said remote device, and deciding on the usability of the at least one measured carrier in said first frequency band for communication by said remote device. Also, a method is proposed, comprising measuring at least one carrier in a first frequency band which is different from a second frequency band which is licensed used for communication by a remote device, and sending, to a network transceiver device, a measurement report of the measurements. Likewise, correspondingly configured devices are addressed.

What is claimed is:

1. A method, comprising:
configuring a remote device to perform measurements for at least one measurement item of at least one carrier in a first frequency band which is different from a second, licensed frequency band used for communication by said remote device, wherein the configuring comprises assigning at least one threshold per measurement item, wherein one of the thresholds corresponds to a channel occupancy of the at least one carrier in the first frequency band;
receiving a measurement report comprising at least an indication of usability for the at least one measured carrier in the first frequency band from said remote device, wherein the at least one threshold is used by the remote device to determine the indication of usability and the indication of usability comprises one of a plurality of carrier type indications, each carrier type indication indicating one carrier type of multiple possible carrier types for a carrier in a cell and based on a combination of emergence number for a primary service and interference strength;
deciding, based at least on the indication of usability, whether to reconfigure the at least one measured carrier in said first frequency band for communication by said remote device; and
using at least one carrier in the second frequency band and at least one of the measured carriers in the first frequency band for communication with said remote device according to the deciding, wherein the first frequency band is at least one of: an unlicensed frequency band and a license-exempt frequency band, wherein using at least one carrier in the second frequency band and at least one of the measured carriers in the first frequency band for communication with said remote device further comprises using a pattern of a selected measured carrier's availability and corresponding carrier type indications for different time periods, using the pattern to select one of the indicated plurality of carrier types to use for communication for a selected one of the different time periods, and using the selected carrier type on the selected measured carrier for the first frequency band for communication with the remote device in the selected time period.

2. A method according to claim 1, wherein the deciding further comprises changing a property of the at least one measured carrier in said first frequency band based on the indication of usability of the at least one measured carrier.

3. A method according to claim 2, wherein
the changed property indicates at least one of the following: use of the carrier as a primary or secondary carrier, release of the carrier, applying cross-scheduling or non-cross scheduling for the carrier.

4. A method according to claim 1, wherein the configuring the remote device for performing measurements further comprises
assigning, per measured carrier, at least one measurement report configuration.

5. A method according to claim 1, further comprising reconfiguring the at least one measured carrier based on the decided usability of the at least one measured carrier for communication by said remote device.

6. A method according to claim 1, further comprising receiving indications of the pattern from the remote device.

7. A method according to claim 1, further comprising:
receiving from the remote device a suggestion to change cross-scheduling of the remote device from one of cross-carrier scheduling or non-cross-carrier scheduling to the other of cross-carrier scheduling or non-cross-carrier scheduling, wherein scheduling is performed for the first frequency band on the second frequency band for cross-carrier scheduling, and wherein scheduling is performed for the first frequency band on the first frequency band for non-cross-carrier scheduling; and
changing, in response, from the one of cross-carrier scheduling or non-cross-carrier scheduling to the other of cross-carrier scheduling or non-cross-carrier scheduling.

8. A method, comprising
receiving, at a remote device and from a network transceiver device, a configuration for measuring at least one measurement item of at least one carrier in a first frequency band which is different from a second, licensed frequency band used for communication by a remote device;
measuring at the remote device the at least one measurement item of the at least one carrier in the first frequency band according to the configuration;
determining at the remote device a usability for each measured carrier of the first frequency band based on at least one threshold level assigned per measurement item for the measured carrier, wherein one of the thresholds corresponds to a channel occupancy of the at least one carrier in the first frequency band, wherein determining the usability further comprises determining a pattern of a selected measured carrier's availability and corresponding carrier type indications for different time periods, and wherein the indication of usability comprises one of a plurality of carrier type indications, each carrier type indication indicating one carrier type of multiple possible carrier types for a carrier in a cell and based on a combination of emergence number for a primary service and interference strength;
sending, by the remote device and to the network transceiver device, indications of the pattern;
sending, by the remote device and to the network transceiver device, a measurement report comprising at least an indication of the usability, comprising a corresponding one of the plurality of carrier type indications, of each measured carrier;

receiving, in response to the sending the indications of the pattern and the sending the measurement report, carrier aggregation information from the network transceiver device, the carrier aggregation information indicating at least one carrier in the second frequency band and at least one of the measured carriers in the first frequency band to use for communication, wherein the first frequency band is at least one of: an unlicensed frequency band and a license-exempt frequency band; and using by the remote device the at least one carrier in the second frequency band and the at least one of the measured carriers in the first frequency band for communication.

9. A method according to claim 8, wherein
at least one measurement report configuration is assigned per measured carrier.

10. A method according to claim 8, wherein
sending of the measurement report is performed based on a measurement report configuration.

11. A method according to claim 10, wherein the measurement report comprises at least an identification of a carrier measured.

12. A method according to claim 11, wherein the carrier type indication is a 2-bit indication.

13. A method according to claim 11, wherein the measurement report further comprises carrier type change indication.

14. A method according to claim 13, wherein the carrier type change indication is a 1-bit indication.

15. A method according to claim 8, further comprising:
sending, by the remote device and to the transceiver device, a suggestion to change cross-scheduling of the remote device from one of cross-carrier scheduling or non-cross-carrier scheduling to the other of cross-carrier scheduling or non-cross-carrier scheduling, wherein scheduling is performed for the first frequency band on the second frequency band for cross-carrier scheduling, and wherein scheduling is performed for the first frequency band on the first frequency band for non-cross-carrier scheduling; and
receiving, in response, scheduling using the other of cross-carrier scheduling or non-cross-carrier scheduling.

16. A computer program product embodied as a non-transitory computer-readable storage medium, comprising computer-executable instructions which, when the instructions are run on a computer, perform the method according to claim 1.

17. A device, comprising:
at least one processor;
at least one non-transitory memory including computer program code, the memory and the computer program code configured to, working with the processor, cause the device to perform at least the following:
configure a remote device for measurements for at least one measurement item of at least one carrier in a first frequency band which is different from a second, licensed frequency band used for communication by said remote device, wherein one of the thresholds corresponds to a channel occupancy of the at least one carrier in the first frequency band, wherein the configuring comprises assigning at least one threshold per measurement item;
receive a measurement report comprising at least an indication of usability for the at least one measured carrier in the first frequency band from said remote device, wherein the at least one threshold is used by the remote device to determine the indication of usability and the indication of usability comprises one of a plurality of carrier type indications, each carrier type indication indicating one carrier type of multiple possible carrier types for a carrier in a cell and based on a combination of emergence number for a primary service and interference strength;
decide, based at least on the indication of usability, whether to reconfigure the at least one measured carrier in said first frequency band for communication by said remote device; and
use at least one carrier in the second frequency band and at least one of the measured carriers in the first frequency band for communication with said remote device according to the decision, wherein the first frequency band is at least one of: an unlicensed frequency band and a license-exempt frequency band, wherein using at least one carrier in the second frequency band and at least one of the measured carriers in the first frequency band for communication with said remote device further comprises using a pattern of a selected measured carrier's availability and corresponding carrier type indications for different time periods, using the pattern to select one of the indicated plurality of carrier types to use for communication for a selected one of the different time periods, and using the selected carrier type on the selected measured carrier for the first frequency band for communication with the remote device in the selected time period.

18. A device according to claim 17, wherein the memory and the computer program code are configured to cause the device to: change a property of the at least one measured carrier in said first frequency band based on the indication of usability of the at least one measured carrier.

19. A device according to claim 18, wherein
the changed property indicates at least one of the following: use of the carrier as a primary or secondary carrier, release of the carrier, applying cross-scheduling or non-cross scheduling for the carrier based on the usability of the at least one measured carrier.

20. A device according to claim 17, wherein configuring the remote device for performing measurements comprises assigning, per measured carrier, at least one measurement report configuration.

21. A device according to claim 17, wherein memory and the computer program code are configured to cause the device to:
reconfigure the at least one measured carrier based on the decided usability of the at least one measured carrier for communication by said remote device.

22. A device, comprising:
at least one processor;
at least one non-transitory memory including computer program code, the memory and the computer program code configured to, working with the processor, cause the device to perform at least the following:
receive, at a remote device and from a network transceiver device, a configuration for measuring at least one measurement item of at least one carrier in a first frequency band which is different from a second, licensed frequency band used for communication by a remote device;
measure at the remote device the at least one measurement item of the at least one carrier in the first frequency band according to the configuration;
determine at the remote device a usability for each measured carrier of the first frequency band based on at least one threshold level assigned per measurement item for the measured carrier, wherein one of the thresholds corresponds to a channel occupancy of the at least one carrier in the first frequency band, wherein determining the usability further comprises determining a pattern of a selected measured carrier's availability and corresponding carrier type indications for different time periods, and wherein the indication of usability comprises one of a plurality of carrier type indications, each carrier type indication indicating one carrier type of multiple possible carrier types for a carrier in a cell and based on a combination of emergence number for a primary service and interference strength;

send, by the remote device and to the network transceiver device, indications of the pattern;

send, by the remote device and to the network transceiver device, a measurement report comprising at least an indication of the usability, comprising a corresponding one of the plurality of carrier type indications, of each measured carrier;

receiving, in response to the sending the indications of the pattern and the sending the measurement report, carrier aggregation information from the network transceiver device, the carrier aggregation information indicating at least one carrier in the second frequency band and at least one of the measured carriers in the first frequency band to use for communication, wherein the first frequency band is at least one of: an unlicensed frequency band and a license-exempt frequency band; and using by the remote device the at least one carrier in the second frequency band and the at least one of the measured carriers in the first frequency band for communication.

23. A device according to claim 22, wherein at least one measurement report configuration is assigned per measured carrier.

24. A device according to claim 22, wherein the memory and the computer program code are configured to cause the device to:

send the measurement report based on a measurement report configuration.

25. A device according to claim 24, wherein the measurement report comprises at least an identification of a carrier measured.

26. A device according to claim 25, wherein the measurement report further comprises carrier type change indication.

27. A method according to claim 26, wherein the carrier type change indication is a 1-bit indication.

28. A device according to claim 22 wherein the carrier type indication is a 2-bit indication.

* * * * *